US012790132B2

(12) United States Patent
Reut et al.

(10) Patent No.: US 12,790,132 B2
(45) Date of Patent: Nov. 10, 2026

(54) METHOD FOR TRANSFERRING COIL SPRINGS FROM A COIL WINDING DEVICE TO A CONVEYOR BELT OF A POCKETED COIL ASSEMBLY MACHINE

(71) Applicant: Spühl GMBH, Wittenbach (CH)

(72) Inventors: Mario Reut, Bischoffszell (CH); Heinz Rhyner, Rheineck (CH)

(73) Assignee: Spühl GmbH, Wittenbach (CH)

( * ) Notice: Subject to any disclaimer, the term of this patent is extended or adjusted under 35 U.S.C. 154(b) by 45 days.

(21) Appl. No.: 18/932,889

(22) Filed: Oct. 31, 2024

(65) Prior Publication Data

US 2025/0051103 A1 Feb. 13, 2025

Related U.S. Application Data

(60) Continuation of application No. 18/485,597, filed on Oct. 12, 2023, now Pat. No. 12,162,696, which is a
(Continued)

(30) Foreign Application Priority Data

Dec. 21, 2018 (EP) .................................... 18215397

(51) Int. Cl.

| | |
|---|---|
| ***B65G 47/82*** | (2006.01) |
| ***B21F 27/16*** | (2006.01) |
| ***B21F 33/02*** | (2006.01) |
| ***B21F 33/04*** | (2006.01) |
| ***B65G 15/58*** | (2006.01) |

(Continued)

(52) U.S. Cl.
CPC .............. *B65G 47/82* (2013.01); *B21F 27/16* (2013.01); *B21F 33/025* (2013.01); *B21F 33/04* (2013.01); *B65G 47/74* (2013.01); *B65G 15/58* (2013.01); *B68G 9/00* (2013.01)

(58) Field of Classification Search
CPC ...... B65G 47/82; B21F 27/16; B21F 27/3304; B21F 33/025
See application file for complete search history.

(56) References Cited

U.S. PATENT DOCUMENTS 3,012,590 A 12/1961 Hodges et al.
3,190,522 A 6/1965 Winters
(Continued)

FOREIGN PATENT DOCUMENTS

CN 201244641 Y 5/2009
CN 101780511 A 7/2010
(Continued)

OTHER PUBLICATIONS

European Patent Office; Search Report and Written Opinion in related Internation Patent Application No. PCT/EP2019/083377 dated Feb. 25, 2020 13 pages.

*Primary Examiner* — James R Bidwell
(74) *Attorney, Agent, or Firm* — Wood Herron & Evans LLP

(57) ABSTRACT

A mechanism for transferring coil springs from a coil winding device to a conveyor belt of a pocketed coil assembly machine comprises a magnetic lift platform for engaging a coil spring before being released at an output of the coil winding device. Further, the mechanism comprises a drive mechanism for moving the lift platform between the output of the coil winding device and the conveyor belt.

12 Claims, 13 Drawing Sheets

Related U.S. Application Data division of application No. 17/312,154, filed as application No. PCT/EP2019/083377 on Dec. 3, 2019, now Pat. No. 11,820,606.

(51) Int. Cl.
*B65G 47/74* (2006.01)
*B68G 9/00* (2006.01)

(56) References Cited

U.S. PATENT DOCUMENTS

| | | | | |
|---|---|---|---|---|
| 3,193,136 | A | 7/1965 | Walter et al. | |
| 3,774,652 | A | 11/1973 | Sturm | |
| 4,050,610 | A | 9/1977 | Sturm | |
| 4,120,392 | A | 10/1978 | Sturm | |
| 4,269,300 | A | 5/1981 | Spuhl | |
| 4,413,659 | A | 11/1983 | Zangerle | |
| 6,155,310 | A | 12/2000 | Haubert et al. | |
| 6,698,459 | B2 * | 3/2004 | Aronson | B21F 33/04 140/92.8 |
| 9,352,913 | B2 | 5/2016 | Manuszak et al. | |
| 9,713,836 | B2 | 7/2017 | Liechti | |
| 11,352,218 | B2 | 6/2022 | Reut | |
| 11,820,606 | B2 | 11/2023 | Reut et al. | |
| 12,162,696 | B2 * | 12/2024 | Reut | B21F 27/16 |
| 2002/0139645 | A1 | 10/2002 | Haubert et al. | |

FOREIGN PATENT DOCUMENTS

| | | | | |
|---|---|---|---|---|
| CN | 205873246 | U | 1/2017 | |
| EP | 2882681 | A1 | 6/2015 | |
| GB | 1127302 | A | 9/1968 | |
| GB | 2504770 | B * | 3/2018 | B68G 9/00 |
| SE | 504366 | C2 * | 1/1997 | B68G 9/00 |
| WO | 9635637 | A1 | 11/1996 | |
| WO | WO-2014023974 | A1 * | 2/2014 | B68G 9/00 |

* cited by examiner

METHOD FOR TRANSFERRING COIL SPRINGS FROM A COIL WINDING DEVICE TO A CONVEYOR BELT OF A POCKETED COIL ASSEMBLY MACHINE

CROSS-REFERENCE TO RELATED APPLICATIONS

This application is a Continuation of U.S. patent application Ser. No. 18/485,597 filed Oct. 12, 2023 (now U.S. Pat. No. 12,162,696), which is a Divisional of U.S. patent application Ser. No. 17/312,154 filed Jun. 9, 2021 (now U.S. Pat. No. 11,820,606), which is a 371 National Phase of International Patent Application No. PCT/EP2019/083377 filed Dec. 3, 2019 (expired), which claim the benefits of priority to European Patent Application No. 18215397.3 filed Dec. 21, 2018, the disclosures of which are incorporated by reference herein.

FIELD OF THE INVENTION

The present invention relates to a mechanism for transferring coil springs, to a pocketed spring assembly machine comprising one or more such mechanisms, and to a method of transferring coil springs in a pocketed spring assembly machine.

BACKGROUND OF THE INVENTION

Mattresses, sofas or other bedding or seating furniture may be provided with innerspring units formed of pocketed springs. The pocketed springs may for example include a spring which is formed of a metallic coil spring and a pocket formed of a non-woven fabric which encloses the coil spring. An innerspring unit may for example be formed by arranging the coil springs in rows on a conveyor belt and then assembling the rows to form the innerspring unit, as for example described in EP 2 801 420 A1. However, reliably and quickly handling the coil springs in a pocketed spring assembly machine is a complex task and may for example result in excessive complexity or cost of the machine or in unsatisfying results concerning assembly speed or precision.

Accordingly, there is a need for techniques which allow for efficiently and precisely transferring coil springs to a conveyor belt of a pocketed spring assembly machine.

BRIEF SUMMARY OF THE INVENTION

The present invention provides a mechanism according to claim 1, a pocketed spring assembly machine according to claim 9, and a method according to claim 10. The dependent claims define further embodiments.

Accordingly, an embodiment of the invention provides a mechanism for transferring coil springs from a coil winding device to a conveyor belt of a pocketed coil assembly machine. The mechanism comprises a magnetic lift platform for engaging a coil spring before being released at an output of the coil winding device. Further, the mechanism comprises a drive mechanism for moving the lift platform between the output of the coil winding device and the conveyor belt. Further, the mechanism comprises a slider for pushing the coil spring from the lift platform to the conveyor belt. Accordingly, the mechanism may transfer the coil springs without requiring complex handling like rotation or mechanical gripping. Still further, the magnetic engagement of the coil spring on the lift platform may allow for moving the coil spring with vertical acceleration exceeding gravity acceleration. Accordingly, in some embodiments the drive mechanism may be configured to drive the moving of the lift platform with vertical acceleration higher than gravity acceleration.

According to an embodiment, the drive mechanism is configured to move the lift platform to a position aligned with a conveying plane of the conveyor belt, and the slider is configured to push the coil spring from the lift platform to the conveyor belt when the magnetic lift platform is in the position aligned with the conveying plane. In this way reliability of transfer of the coil spring from the lift platform to the conveyor belt may be further enhanced.

According to an embodiment, the drive mechanism comprises a crank drive. The crank drive may be used for driving the movement in a manner which facilitates engaging the coil spring at the output of the coil winding device and/or pushing the coil spring from the lift platform to the conveyor belt. For example, the above-mentioned position aligned with the conveying plane may correspond to a dead center of the crank drive. In that case, pushing the coil spring from the lift platform to the conveyor belt is facilitated by intrinsically low speed of the movement of the lift platform in the range of the position aligned with the conveying plane.

According to an embodiment, the slider is configured to push the coil spring in a direction aligned with a conveying direction of the conveyor belt. In this case, the lift platform may be arranged in a space efficient manner at a short edge of the conveyor belt, which may for example be desirable when another conveyor belt or other component of the pocketed spring assembly machine is arranged in parallel to the conveyor belt.

According to an embodiment, the slider has a support surfaces diverging in a V-shaped manner for engaging the coil spring being pushed from the magnetic lift platform. This configuration may be used for reliably supporting coil springs of various geometry and size. Further, this configuration may allow for utilizing the pushing of the coil spring from the lift platform to the conveyor belt to efficiently and reliably align the coil spring on the conveyor belt.

According to an embodiment, the slider has a support element for engaging between two coil windings of the coil spring being pushed from the magnetic lift platform. This configuration of the slider may allow for enhancing the support provided for the coil spring being pushed and avoiding tilting of the coil spring. In some scenarios, the support element may be configured to engage on a lower end winding of the coil spring being pushed by the slider.

According to a further embodiment of the invention, a pocketed spring assembly machine is provided which comprises at least one mechanism according to any one of the above embodiments. The pocketed spring assembly machine may comprise multiple coil winding devices and multiple conveyor belts, each being associated to a corresponding one of the conveyor belts. A respective mechanism according to any one of the above embodiments may be provided for each of the coil winding devices and the associated conveyor belt.

According to a further embodiment of the invention, a method for transferring coil springs from a coil winding device to a horizontal conveyor belt of a pocketed coil assembly machine is provided. The method may be implemented by a mechanism according to any one of the above embodiments. The method comprises:

- before release of a coil spring at an output of the coil winding device, engaging the coil spring on a magnetic lift platform;

moving the lift platform between the output of the coil winding device and the conveyor belt; and pushing the coil spring by a slider from the lift platform to the conveyor belt.

According to an embodiment, the method further comprises:

moving the lift platform to a position aligned with a conveying plane of the conveyor belt; and pushing the coil spring from the lift platform to the conveyor belt when the lift platform is in the position aligned with the conveying plane.

According to an embodiment, the method further comprises driving the moving of the lift platform by a crank drive. In this case, the above-mentioned position aligned with the conveying plane may correspond to a dead center of the crank drive.

According to an embodiment, the method further comprises driving the moving of the lift platform with vertical acceleration higher than gravity acceleration.

According to an embodiment, the pushing of the coil spring is in a direction aligned with a conveying direction of the conveyor belt.

In the above mechanism and method, the conveyor belt may have a substantially horizontal conveying plane and receive the coil springs in a substantially vertical orientation. The pushing of the coil spring from the lift platform to the conveyor belt may then be accomplished in a horizontal direction. At the output of the coil winding mechanism, the coil spring may be provided in this substantially vertical orientation so that no rotation of the coil spring is required in the transfer from the coil winding device to the conveyor belt. Accordingly, the coil springs may be produced and transferred in an orientation which is substantially perpendicular to the conveying plane. The conveying plane being substantially horizontal may cover that the conveying plane has an angle in a range of 0° to 30°, preferably 0° to 15°, and typically 0° to 5° with respect to a horizontal orientation. The substantially horizontal orientation may help to avoid that the positioning of the coil springs on the conveyor belts is affected by gravitational force. However, it is noted that other orientations of the conveyor belt are possible as well, and that the orientation on which the coil springs are produced and transferred could then be adapted accordingly to be perpendicular to the conveying plane of the conveyor belt.

BRIEF DESCRIPTION OF DRAWINGS

Embodiments of the invention will be described with reference to the accompanying drawings.

DETAILED DESCRIPTION OF EMBODIMENTS

Exemplary embodiments of the invention as explained in the following relate to a mechanism for transferring of coil springs a pocketed spring assembly machine. In the illustrated examples, it is assumed that pocketed spring assembly machines is provided with one or more coil winding devices and one or more conveyor belts for the coil springs, and that the mechanism is used for transferring the coil springs produced by the coil winding device(s) to the conveyor belt(s). As further illustrated below, the pocketed spring assembly machine may be provided with multiple coil winding devices and a corresponding conveyor belt for each of the coil winding devices. In the illustrated examples, the conveyor belts are assumed to be horizontal conveyor belts on which the coil springs are received in a vertical orientation. However, it is noted that other orientations are possible as well, e.g., a orientation of the conveyor belts defining a conveying plane which deviates by up to 5°, up to 15°, or even up to 30° from a horizontal orientation. Such orientations are herein also referred to as substantially horizontal.

Figure 1:
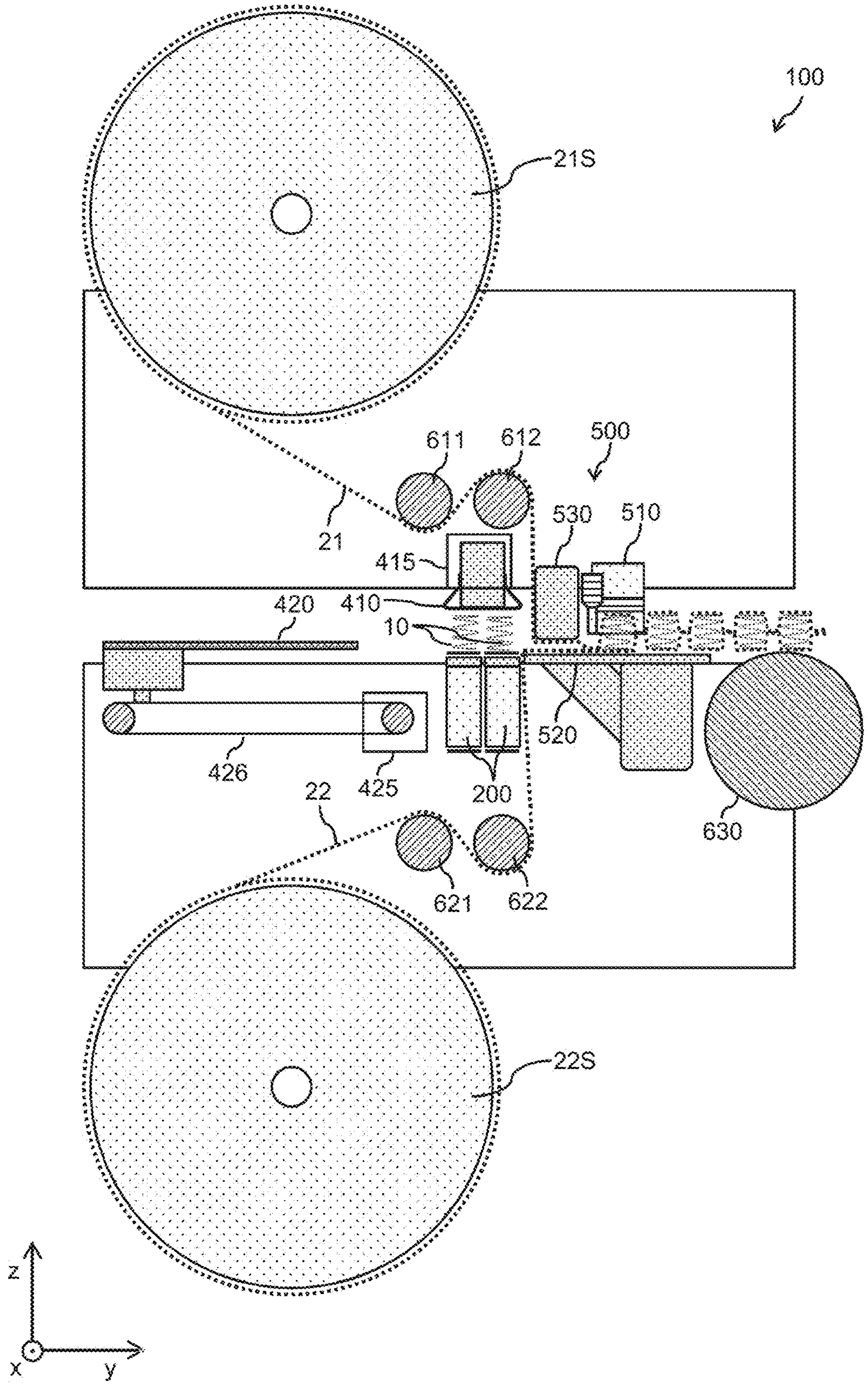
FIG. 1 shows a schematic sectional view of a pocketed spring assembly machine according to an embodiment of the invention.

FIG. 1 shows a schematic sectional view for illustrating the pocketed spring assembly machine 100. As illustrated, the pocketed spring assembly machine 100 is provided with a welding stage 500 and a pair of belt conveyor mechanisms 200 arranged adjacent to the welding stage 500. The belt conveyor mechanisms 200 are configured to convey coil springs 10 in a horizontal conveying direction, extending perpendicular to a plane of the drawing (in an x-direction). On the belt conveyor mechanisms 200, the coil springs 10 are arranged oriented along a vertical direction (in a z-direction). By transferring the coil springs individually onto the belt conveyor mechanisms 200 and controlling the advancing the belt conveyor mechanisms 200 after the transfer of each coil spring 10, a desired arrangement of the coil springs 10 in rows along the conveying direction can be defined on the belt conveyor mechanisms 200.

FIG. 1 further illustrates components of a coil insertion mechanism for inserting the coil springs in the desired arrangement between an upper fabric 21 and a lower fabric 22. In particular, FIG. 1 illustrates a compression device 410 and a push blade 420. Vertical movement of the compression device 410 (in the z-direction) is driven by an actuator mechanism 415, e.g., based on an electric motor and/or pneumatic actuator. The push blade 420 is movable in a horizontal direction, perpendicular to the conveying direction of the belt conveyor mechanisms 200 (the y-direction). In the illustrated example, the horizontal movement of the push blade 420 is driven by an electric motor 425 and a belt drive 426. It is however noted that other types of actuator mechanisms could be used as well, e.g., based on a rack gear or the like.

Using the compression device 410, the arrangement of the coil springs 10 formed on the belt conveyor mechanisms 200 are compressed while being maintained on the belt conveyor mechanisms 200. The compression device 410 may be configured as a bar covering the area of both belt conveyor mechanisms 200, so that all the coil springs 10 arranged on the belt conveyor mechanisms 200 can be simultaneously compressed by the compression device 410. The compression device 410 thus allows for efficiently compression the coil springs 10, regardless of their position on the belt conveyor mechanisms 200 or their characteristics, such as spring geometry or wire thickness.

From the conveyor mechanisms 200, a push blade 420 pushes the compressed coil springs 10 are then pushed perpendicular to the conveying direction (in a y-direction) between the upper fabric 21 and the lower fabric 22 which are guided through the welding stage 500 of the pocketed spring assembly machine 100. The fabrics 21, 22 are illustrated by dotted lines. As illustrated, the fabrics 21, 22 may be supplied from corresponding supply rolls 21S, 22S and guided by rollers 611, 612, 621, 622. The rollers 611, 612, 621, 622 may also be used for adjusting tension of the fabrics 21, 22 to a desired level.

The welding stage 500 is provided with an ultrasonic welding tool 510 and an anvil stage 520. The welding tool 510 may be provided with one or more ultrasonic horns that cooperate with an welding anvil on the anvil stage 520. During operation of the ultrasonic welding tool 510, the one or more ultrasonic horns of the ultrasonic welding tool 510 press the fabrics 21, 22 together and against an anvil on the anvil stage, so that the fabrics 21, 22 are welded together to form pockets enclosing the coil springs 10. Here, it is noted that the ultrasonic welding tool 510 may be provided with multiple ultrasonic horns which can be used to simultaneously form welds at different positions along the x-direction. Further, it is possible that the ultrasonic horns are movable along the x-direction, so that multiple welds at different positions along the x-direction can be formed by the same ultrasonic horn.

As further illustrated, the welding stage 500 may be provided with a clamping device 530 which pushes the upper fabric 21 towards the lower fabric 22. The clamping device 530 may be configured as a bar extending substantially over the width of the fabrics 21, 22 along the x-direction and may be movable along the z-direction. Using the clamping device 530 to push the upper fabric 21 towards the lower fabric 22 may facilitate the welding of the fabrics 21, 22 and also assist in the process of pushing the compressed coil springs 10 between the fabrics 21, 22.

By repeating the above process of arranging the coil springs 10 in rows, pushing the coil springs 10 between the fabrics 21, 22, and welding the fabrics 21, 22 together, an innerspring unit with multiple rows of pocketed coil springs 10 can be formed by the pocketed spring assembly machine 100. As further illustrated, one or more transport rollers 630 may be provided for conveying the finished innerspring unit at an output side of the pocketed spring assembly machine 100.

FIGS. 2A-2E show schematic sectional views for illustrating operation of a coil transfer mechanism 300 of the pocketed spring assembly machine 100. Although FIGS. 2A-2E illustrate the coil transfer mechanism 300 for one belt conveyor mechanism 200 and corresponding coil winding device 110, it is noted that corresponding structures and functionalities are provided for each belt conveyor mechanism 200 and associated coil winding device 110 of the pocketed spring assembly machine 100. FIGS. 2A-2E also illustrate further structures of the belt conveyor mechanism 200. As illustrated, the belt conveyor mechanism 200 is provided with a conveyor belt 210. The conveyor belt 210 may be magnetic. For example, the conveyor belt 210 may be provided with a homogeneous permanent magnetic layer, which may be embedded in the conveyor belt 210 or formed on a surface of the conveyor belt. Alternatively or in addition, permanent magnetic material may otherwise be embedded in the conveyor belt 210, e.g., in the form of particles or stripes. Alternatively or in addition, the conveyor belt may be provided with an adhesive surface coating. By using a magnetic conveyor belt 210, the coil springs 10 on the conveyor belt 210 may be reliably held in their respective position on the conveyor belt 210. The magnetic force provided by the conveyor belt 210 may be selected in such a way that it is sufficient for reliably holding the coil springs 10 also during acceleration of the conveyor belt 210. At the same time, the magnetic force provided by the conveyor belt 210 may be selected to be sufficiently low to avoid negative impact on the below described pushing of the coil springs 10 onto or from the conveyor belt 210.

As further illustrated, the belt conveyor mechanism 200 is provided with a pair of rollers 220 supporting the conveyor belt 210, an electric motor 230 driving the conveyor belt 210. Further, the belt conveyor mechanism 200 is provided with a guide element 240 which guides horizontal movement of the conveyor belt 210 (in the x-direction) and supports the conveyor belt 210 against vertical displacement (in the z-direction) and optionally also transversal displacement (in the y-direction). For the latter purpose, the guide element 240 may be provided with a protrusion extending into a gap between the conveyor belt 210 and the conveyor belt 210 of the neighboring belt conveyor mechanism 200.

As illustrated in FIGS. 2A-2E, the coil transfer mechanism 300 is provided with a lift platform 310. The lift platform 310 is movable in a vertical direction (in the z-direction). In particular, the lift platform 310 is movable between a first position at an output of the coil winding device 110 and a second position, in which an upper surface of the lift platform 310 is aligned with an upper surface of the conveyor belt 210 of the belt conveyor mechanism 200. The upper surface of the conveyor belt 210 defines a conveying plane of the belt conveyor mechanism 200. For adjusting the alignment, the vertical position of the conveyor belt 210 and of the guide element 240 may be adjustable.

For driving the movement of the lift platform 310, the coil transfer mechanism 300 is provided with a drive mechanism 315. In the illustrated example, the drive mechanism 315 is based on a crank drive 316 which is driven by an electric motor 317. The first position may correspond to an upper dead center of the crank drive 316, whereas the second position may correspond to a lower dead center of the crank drive 316. In some scenarios, the first position could also be adjustable, e.g., to accommodate different geometries of the coil springs 10, in particular different lengths of the coil springs 10, produced by the coil winding device 110. However, it is noted that other types of drive mechanisms could be used as well, e.g., based on a belt drive, a rack gear, a pneumatic drive, or the like. In the illustrated example, it is assumed that the movement of the lift platform 310 is only along the vertical direction (the z-direction). However, it is noted that additional movement components along the x-direction and/or the y-direction could be provided as well, e.g., in order to accommodate a different relative placement of the coil winding device 110 and the belt conveyor mechanism 200. In some scenarios, the movement of the lift platform 310 could also be driven by a pivoting mechanism.

Further, the coil transfer mechanism 300 is provided with a slider 320. The slider 320 is movable in a horizontal direction aligned with the conveying direction of the belt conveyor mechanism 200 (in the x-direction). For driving the horizontal movement of the slider 320, the coil transfer mechanism 300 is provided with a drive mechanism 325. In the illustrated example, the drive mechanism 325 is based on a belt drive 326 driven by an electric motor 327. However, it is noted that other types of drive mechanisms could be used as well, e.g., based on a rack gear. Along the vertical direction, the slider 320 is arranged slightly above the second position of the lift platform 310, so that in the second position of the lift platform 310 the slider 320 can be moved horizontally over the lift platform 310.

As further illustrated, the coil transfer mechanism 300 may also be provided with a sensor 350 for detecting the positions of the coil springs 10 transferred to the conveyor belt 210 of the belt conveyor mechanism 200. For example, the sensor 350 could be based on optical sensing of light reflected by the conveyor belt 210 or the coil springs 10 placed on the conveyor belt 210.

The coil winding device 110 is configured to wind the coil springs 10 from steel wire supplied to the coil winding device 100, e.g., from a wire swift. The winding of the coil springs 10 occurs according to a vertical orientation of the coil springs 10, i.e., around a vertical axis. Accordingly, a lower end ring of a coil spring 10', 10" being wound by the coil winding device 100 is oriented substantially in a horizontal plane, in parallel to the upper surface of the lift platform 310, as for example illustrated in FIGS. 2A, 2B, 2D, and 2E.

The operation of the coil transfer mechanism 300 will now be further explained by referring to different operation stages of the coil transfer mechanism 300 as illustrated in FIGS. 2A-2E.

Figure 2A:
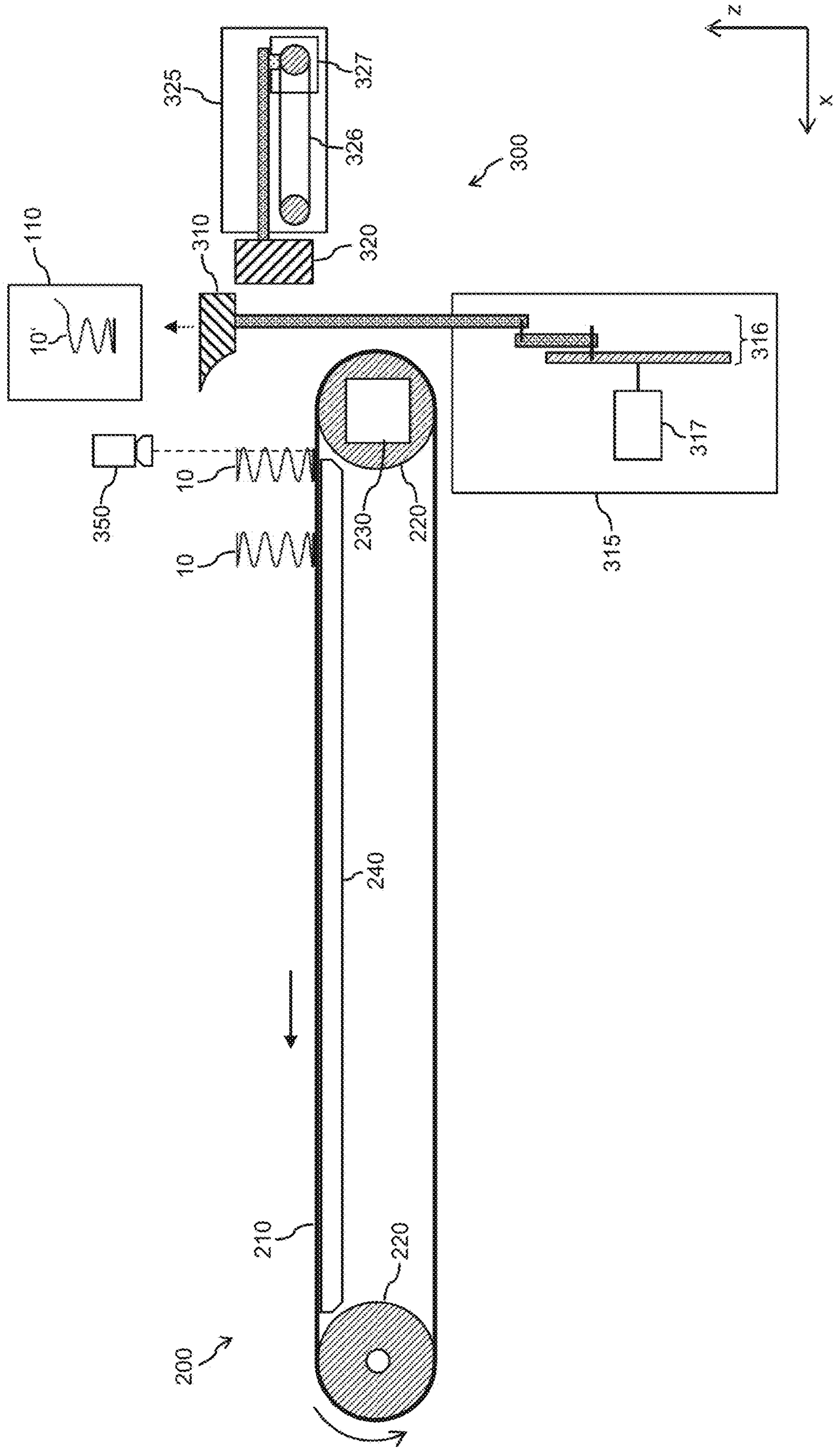
FIGS. 2A-2E show schematic sectional views for illustrating operation of a coil transfer mechanism of the pocketed spring assembly machine.

FIG. 2A illustrates an operation stage in which some coil springs 10 are already placed on the conveyor belt 210 of the belt conveyor mechanism 200 and a further coil spring 10' is being wound by the coil winding device 110. In this operation stage, the drive mechanism 315 moves the lift platform 310 vertically upward towards the first position, as illustrated by a dotted arrow. At the same time, the slider 320 is in a retracted position which does not interfere with the vertical movement of the lift platform 310. As further illustrated by a solid arrow, the belt conveyor mechanism 200 may operate to advance the coil springs 10 already placed on the conveyor belt 210 in the conveying direction. Here, the sensor 350 may be used to detect movement of the coil springs 10 and their relative positions along the conveying direction.

Figure 2B:
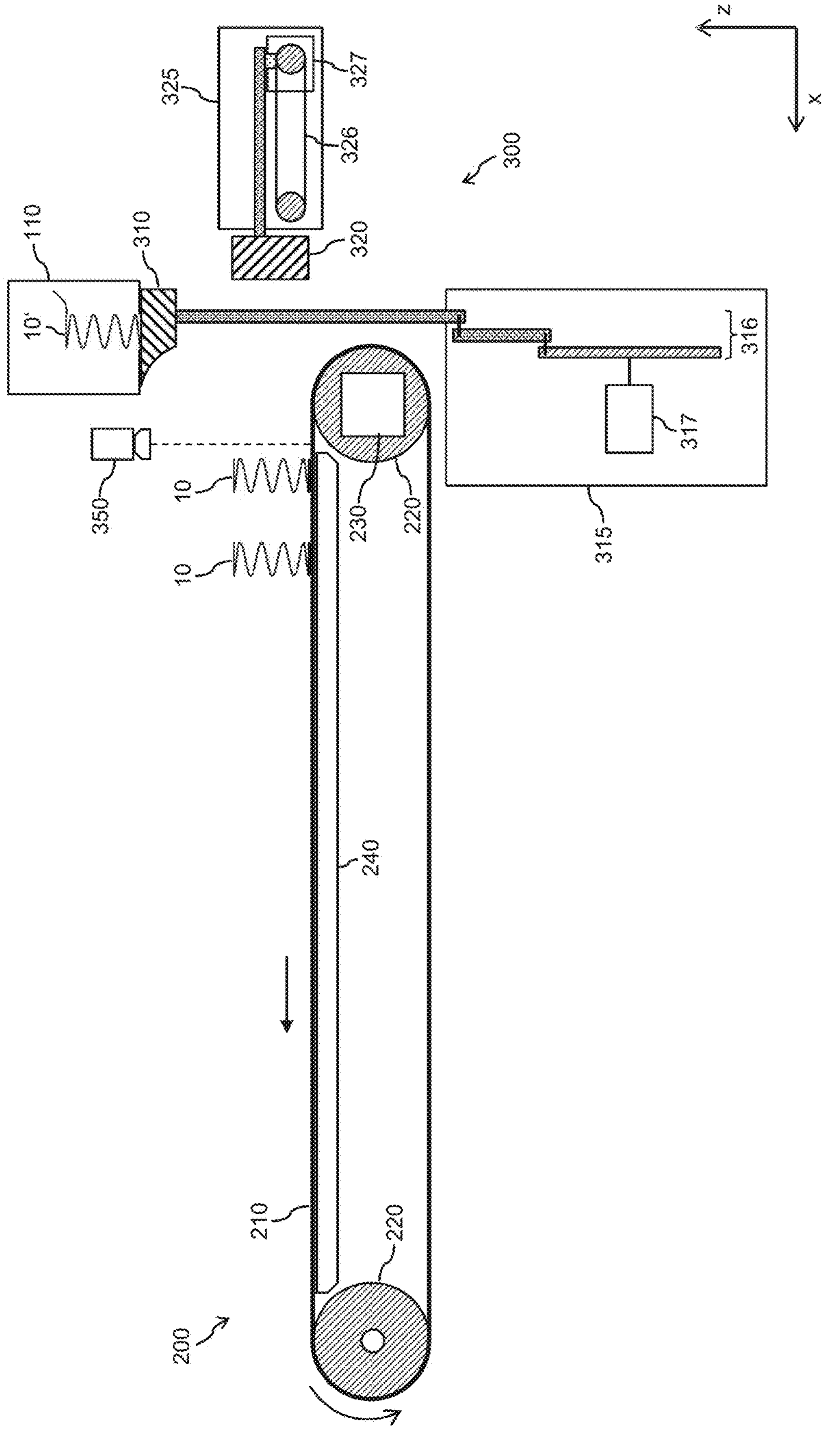

FIG. 2B illustrates a further operation stage in which winding of the coil spring 10' is finished, but the coil spring 10' is not yet released from the coil winding device 110. In this operation stage, the lift platform 310 reaches the first position at the output of the coil winding device 110, resulting in the lift platform 310 magnetically engaging with the lower end ring of the coil spring 10'. At the same time, the slider 320 is still in the retracted position, and the belt conveyor mechanism 200 may operate to further advance the coil springs 10 already placed on the conveyor belt 210 in the conveying direction. Again, the sensor 350 may be used to detect movement of the coil springs 10 and their relative positions along the conveying direction.

Figure 2C:
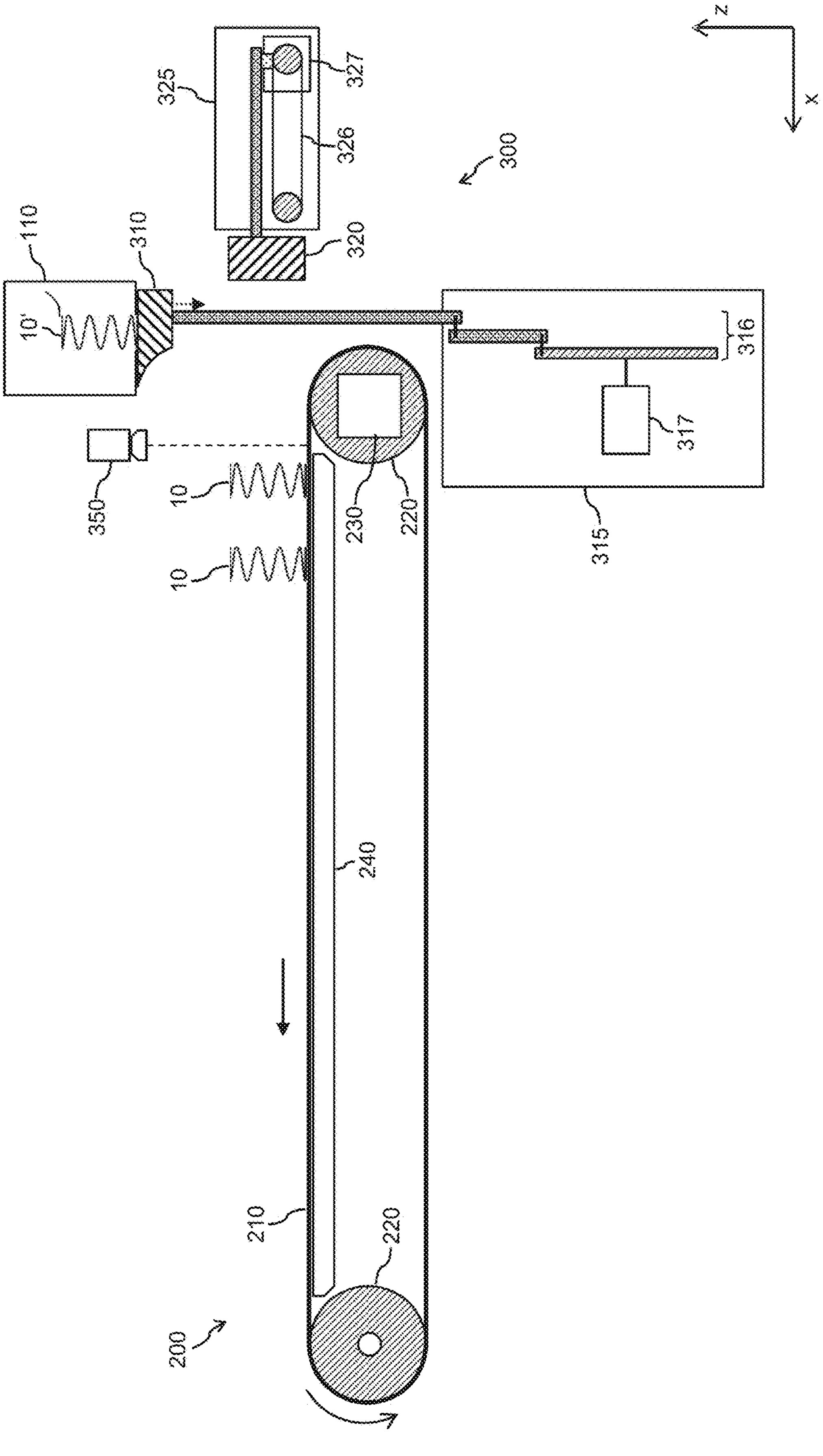

FIG. 2C illustrates a further operation stage in which the coil spring 10' is released from the coil winding device 110, e.g., by cutting the coil spring 10' from the wire supplied to the coil winding device 110. Irrespective of being released from the coil winding device 110, the coil spring 10' is held in position due to the magnetic engagement with the lift platform 310 positioned at the output of the coil winding device 110. As illustrated by a dotted arrow, the lift platform 310 then start moving vertically downwards towards the second position. At the same time, the slider 320 is still in the retracted position, and the belt conveyor mechanism 200 may operate to further advance the coil springs 10 already placed on the conveyor belt 210 in the conveying direction. Again, the sensor 350 may be used to detect movement of the coil springs 10 and their relative positions along the conveying direction.

Figure 2D:
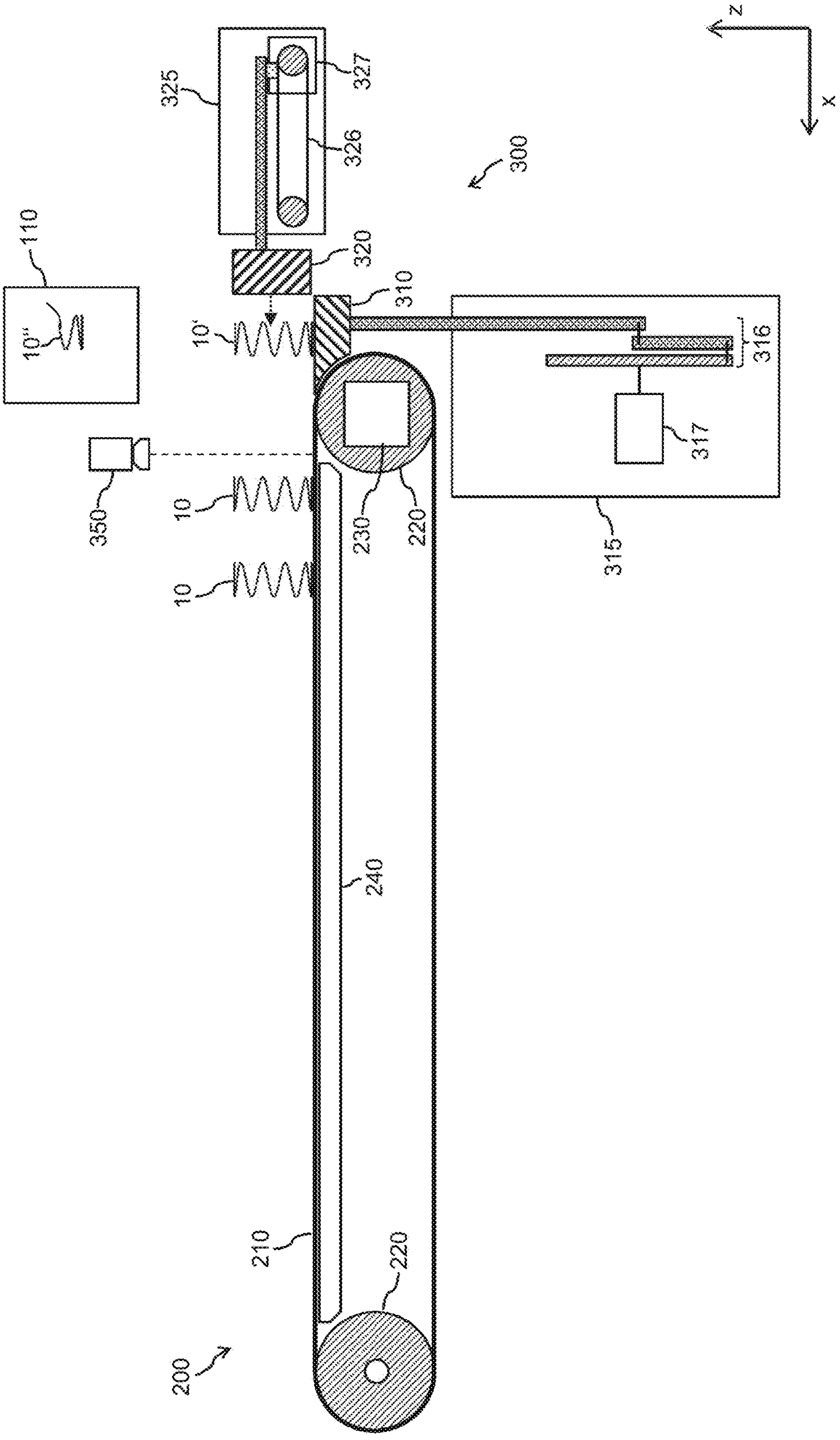

FIG. 2D illustrates a further operation stage in which the lift platform 310, with the coil spring 10' engaged on it, has reached the second position in which the upper surface of the lift platform 310 is aligned with the upper surface of a conveyor belt 210 of the belt conveyor mechanism 200. In this operation stage, the slider 320 starts moving vertically towards the coil spring 10' on the lift platform 310, as illustrated by a dotted arrow. As further illustrated, the coil winding device 110 may already have started winding of a next coil spring 10". The vertical movement of the slider 320 continues until the slider 320 engages with the coil spring 10' and pushes the coil spring 10' vertically from the lift platform 310 to the conveyor belt 210 of the belt conveyor mechanism 200. As also illustrated, a lower part of the lift platform 310 has a cross sectional shape which tapers towards the conveyor belt 210 and matches the curvature of the end portion of the conveyor belt 210. In this way, a gap between the lift platform 310 and the conveyor belt 210 can be minimized and a risk of the coil spring 10' getting caught at the transition from the lift platform 310 to the conveyor belt 210 can be minimized.

While pushing the coil spring 10' from the lift platform 310 to the conveyor belt 210, the conveyor belt 210 may be stationary in order to allow for a more precise placement of the coil spring 10' on the conveyor belt 210. However, it is noted that pushing the coil spring 10' from the lift platform 310 to the conveyor belt 210 could also be accomplished while the conveyor belt 210 is advancing along the conveying direction. Further, the slider 320 could be used to push the coil spring 10' into a position where the coil spring 10' is partially on the conveyor belt 210 and partially still on the lift platform 310, and advancement of the conveyor belt 210 could then be used for fully removing the coil spring 10' from the lift platform 310. Also in this operation stage, the sensor 350 may be used to detect movement of the coil springs 10 and their relative positions along the conveying direction of the belt conveyor mechanism 200. Accordingly, pushing of the coil spring 10' from the lift platform 310 to the conveyor belt 210 may be accomplished while the conveyor belt 210 is stationary or while the conveyor belt 210 is moving, optionally at lower speed than in other operation stages of the coil transfer mechanism 300.

Figure 2E:
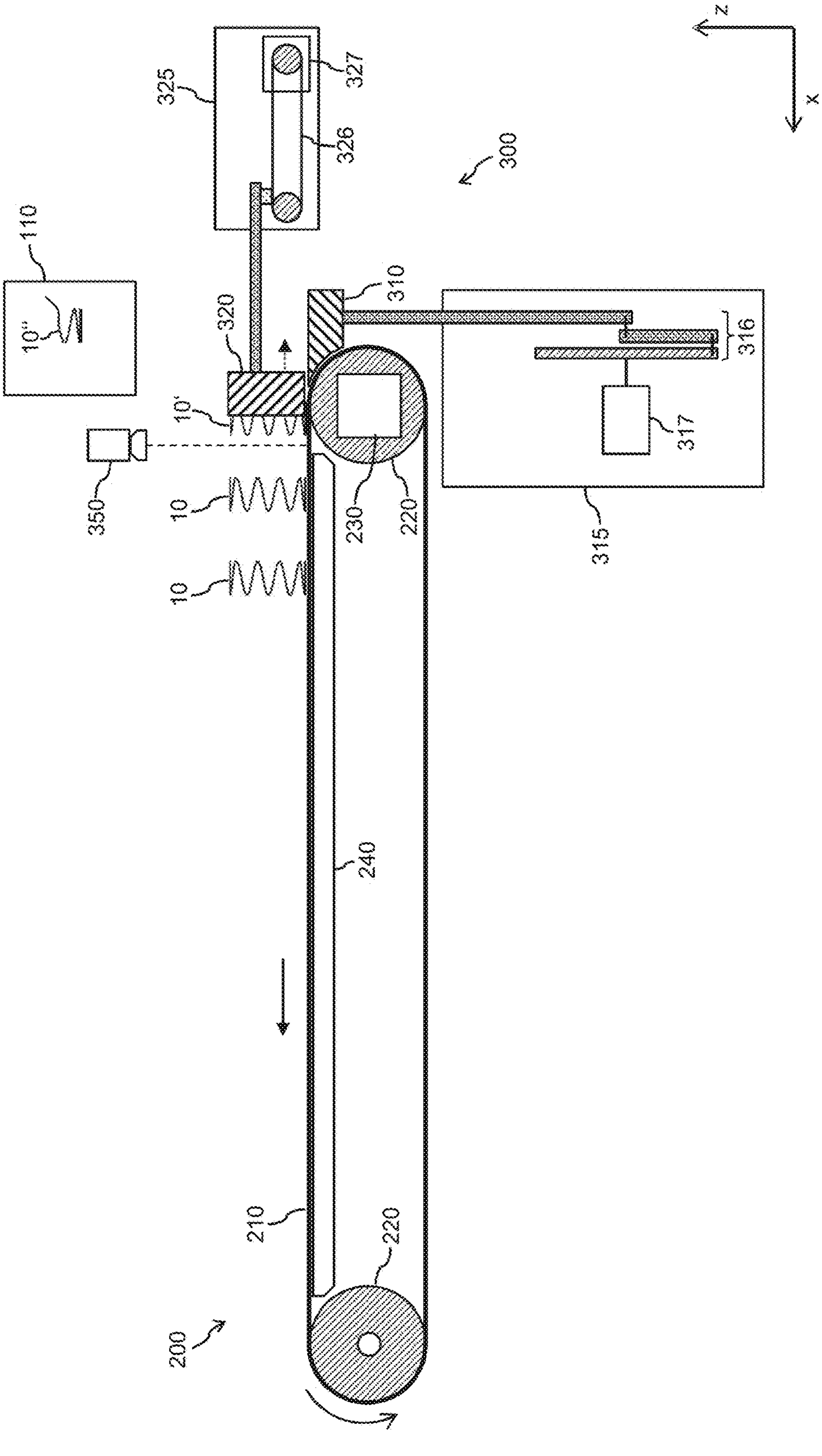

FIG. 2E illustrates a further operation stage in which the lift platform 310 is still in the second position, but the coil spring 10' was already pushed onto the conveyor belt 210. In this operation stage, the slider 320 starts moving back towards its retracted position, as illustrated by a dotted arrow. At this operation stage, the belt conveyor mechanism 200 may operate to further advance the coil springs 10, 10' placed on the conveyor belt 210 in the conveying direction.

As can be seen, the advancement of the conveyor belt 210 between placing the individual coil springs 10 on the conveyor belt 210 may be used to efficiently and precisely control the arrangement of the coil springs 10 on the conveyor belt 210, in particular the relative spacing of the coil springs 10. This may be accomplished without requiring adjustment of a stroke of the slider 320. As a result, the coil springs 10 may be arranged in an equidistant manner on the conveyor belt. However, other arrangements are possible as well. The magnetic lift platform 310 and the slider 320 allow for precisely placing the coil springs 10 on the conveyor belt 210. The magnetic engagement of the coil spring 10 on the lift platform 310 helps to ensure that the coil spring 10 being transferred is reliably held on the lift platform 310 during movement of the lift platform 310. Still further, the magnetic engagement of the coil spring 10 on the lift platform 310 may enable driving the vertical movement of the lift platform 310 with more than gravity acceleration, which may contribute to a higher overall operating speed of the pocketed spring assembly machine 100.

Figure 3A:
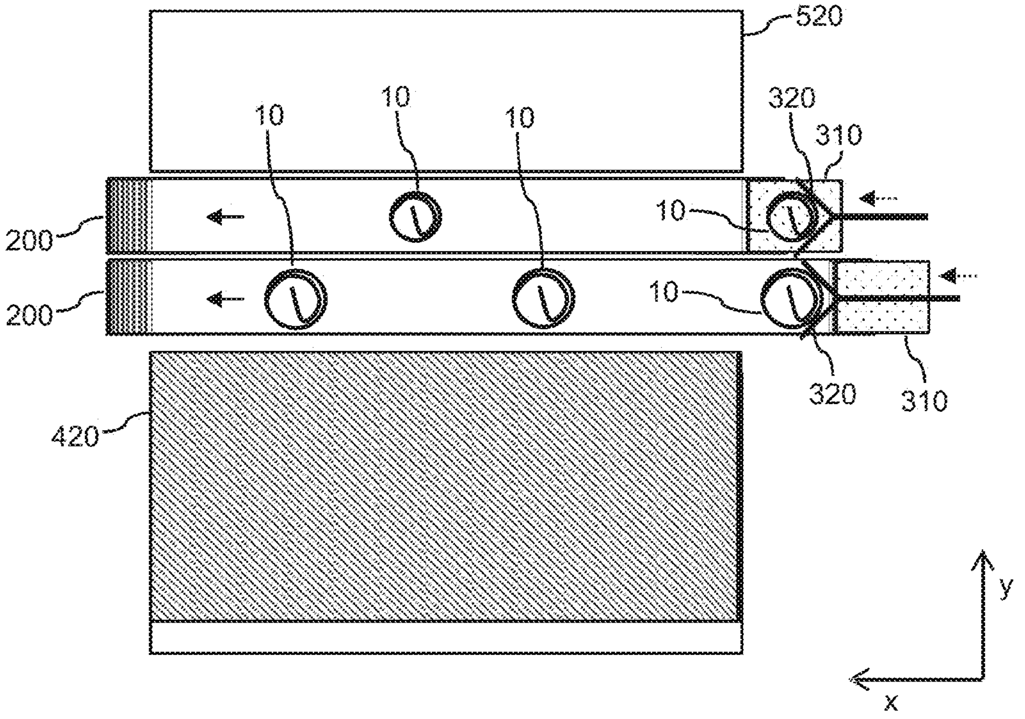
FIGS. 3A and 3B show schematic partial top views for further illustrating operation of the coil transfer mechanism and utilization of multiple belt conveyor mechanism for defining a desired arrangement of coil springs.
Figure 3B:
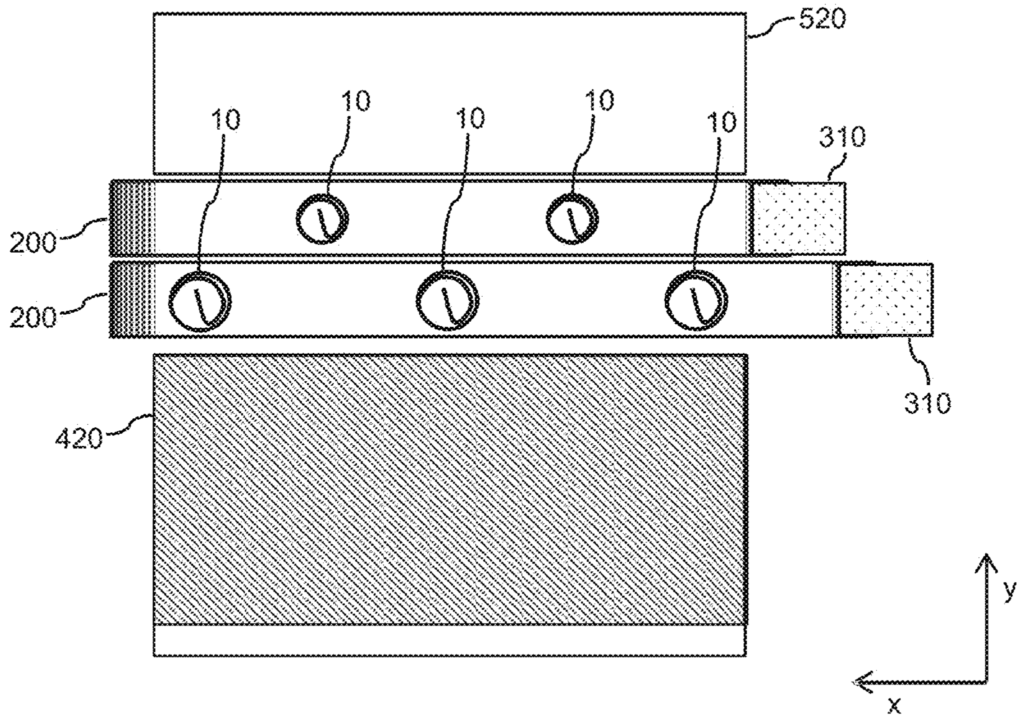

FIGS. 3A and 3B show partial top views for further illustrating the formation of a desired arrangement of the coil springs 10 by individually placing the coil springs 10 on the conveyor belts 210 of the two belt conveyor mechanisms 200. FIG. 3A illustrates pushing of an additional coil spring 10 onto each of the belt conveyor mechanisms 200, similar to FIGS. 2D and 2E. The vertical pushing movement of the sliders 320 is indicated by dotted arrows. In each case, the additional coil spring is pushed into a position which has a desired distance to the next coil spring 10 already placed on the belt conveyor mechanism 200. The distance can be precisely controlled by the advancement of the conveyor belt 210 in the conveying direction, illustrated by solid arrows. As further illustrated in FIG. 3A, the sliders 320 have a V-shaped cross sectional geometry along the vertical axis. Accordingly, the sliders 320 have vertical support surfaces diverging in a V-shaped manner for engaging the coil spring 10 being pushed from the lift platform 310. The V-shaped cross-sectional geometry helps in aligning the coil spring 10 in a well-defined position on the belt conveyor mechanism 200 and is suitable for pushing coil springs 10 of various geometries in a reliable manner from the lift platform 310 to the belt conveyor mechanism 200.

FIG. 3B illustrates a situation in which all coil springs of the desired arrangement are already placed on the belt conveyor mechanisms 200, and the two belt conveyor mechanisms 200 have been advanced to positions which also ensure a desired spacing along the x-direction between the coil springs 10 on the different belt conveyor mechanisms 200. Here, utilization of the two parallel belt conveyor mechanisms 200 with the corresponding individual coil winding devices 110 may allow for forming the desired arrangement more quickly than in a scenario using only one belt conveyor mechanism 200 and coil winding device 110. Still further, the utilization of the two parallel belt conveyor mechanisms 200 with the corresponding individual coil winding devices 110 enables efficient formation of arrangements with mixed types of coil springs 10. In the illustrated example, it is for example assumed that the two parallel belt conveyor mechanisms 200 and the corresponding individual coil winding devices 110 are each used for providing coil springs 10 of different spring geometry.

Figure 4A:
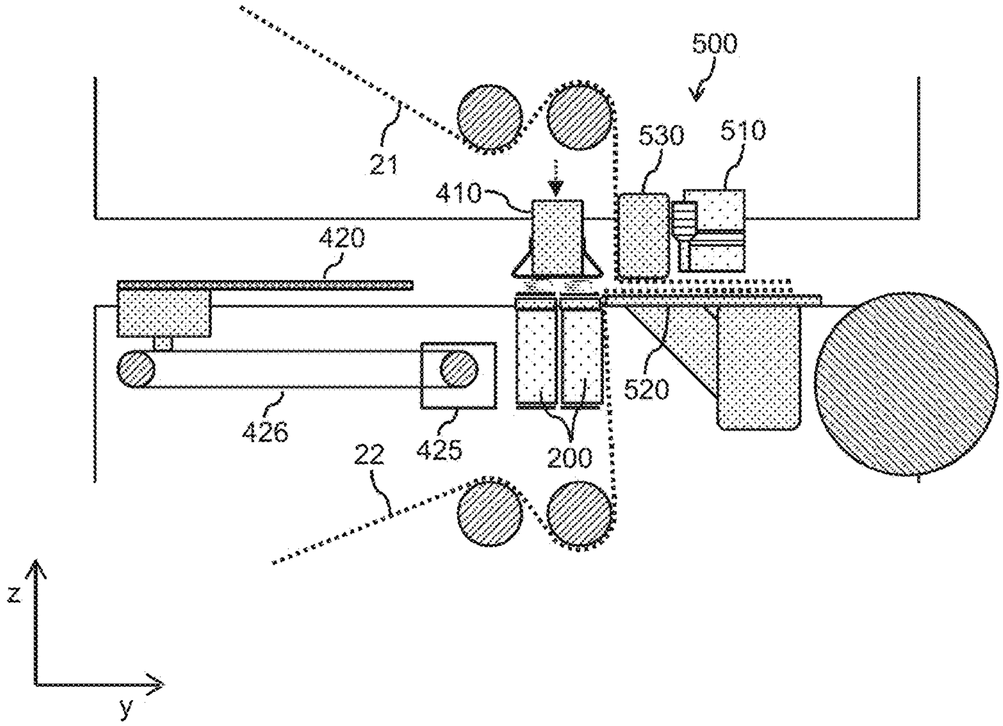
FIGS. 4A and 4B show schematic sectional views for illustrating structures and operation of a spring insertion mechanism for pushing the coil springs between fabrics for formation of pockets enclosing the coil springs.
Figure 4B:
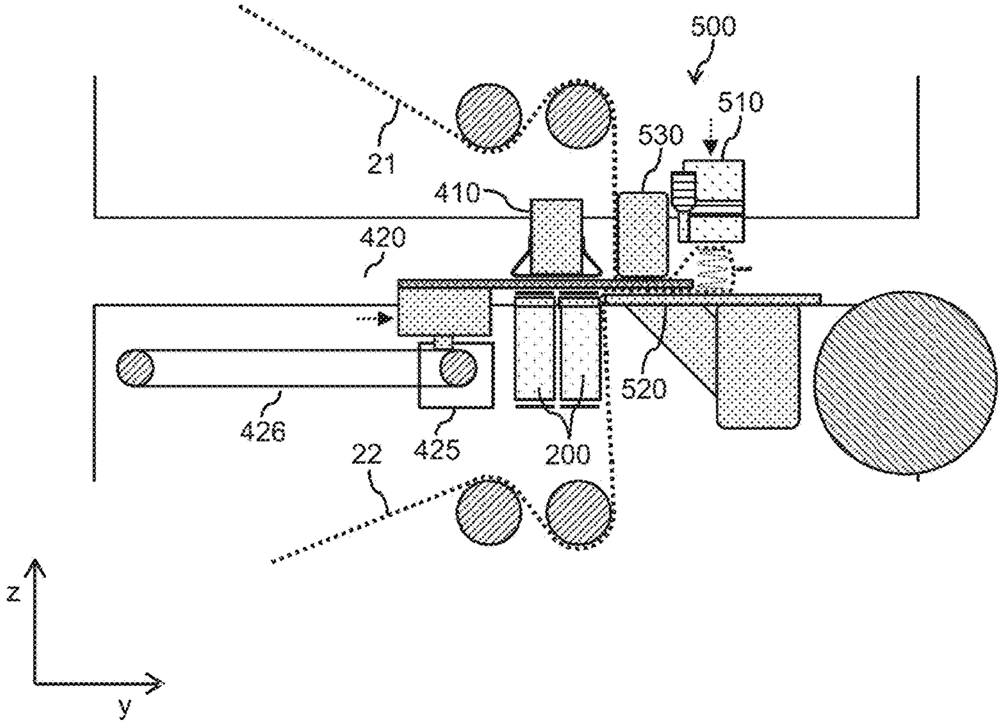
Figure 5A:
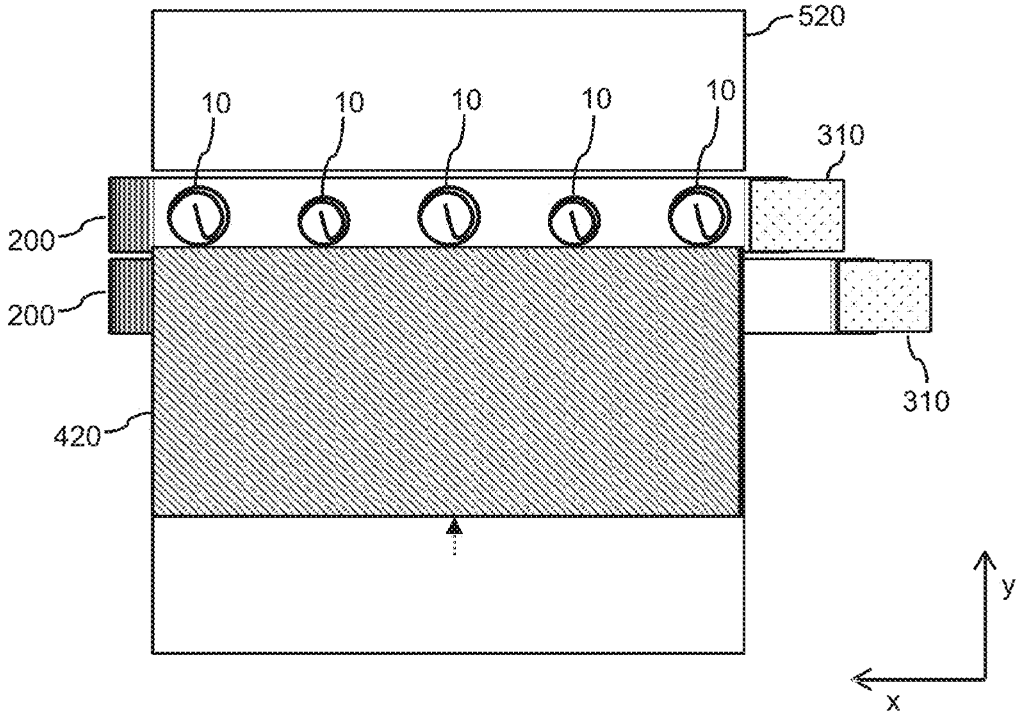
FIGS. 5A and 5B show schematic partial top views for further illustrating operation of the spring insertion mechanism.
Figure 5B:
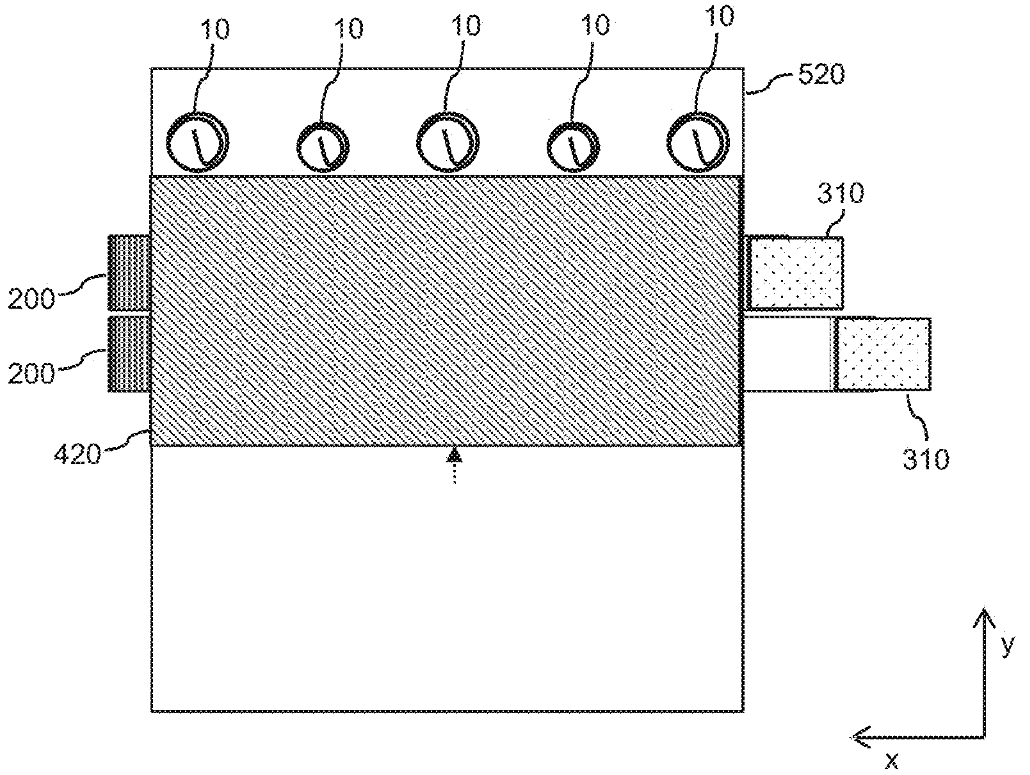

FIGS. 4A and 4B show schematic sectional views and FIGS. 5A and 5B schematic partial top views for illustrating structures and operation of the spring insertion mechanism which is used for pushing the coil springs 10 between the fabrics 21, 22. In particular, FIG. 4A illustrates compression of the coil springs 10 by the compression device 410. Vertical movement of the compression device 410 to compress the coil springs 10 arranged on the belt conveyor mechanisms 200 is illustrated by a dotted arrow. The compression of the coil springs 10 is accomplished when all coil springs 10 needed for formation of a single coil spring row of the innerspring unit have been placed on the conveyor belts 200 and brought to a desired arrangement along the x-direction, e.g., as illustrated in FIG. 3B.

After compressing the coil springs 10 on the belt conveyor mechanisms 200, the push blade 420 moves in the y-direction, i.e., perpendicular to the conveying direction of the belt conveyor mechanisms 200. As illustrated in FIG. 4B, the push blade 420 eventually engages the compressed coil springs 10 on the belt conveyor mechanisms 200 and pushes the coil springs 10 from the belt conveyor mechanisms 200 to the welding stage 500, in between the fabrics 21, 22 which are guided through the welding stage 500. As illustrated by FIG. 5A, the push blade 420 first engages with the coil springs 10 on one of the belt conveyor mechanisms 200, and pushes these coil springs 10 onto the other belt conveyor mechanism 200, until the push blade 420 also engages the coil springs 10 on the other belt conveyor mechanism 200 and continues to push the coil springs 10 from both belt conveyor mechanisms 200 into the welding stage 500, as illustrated in FIG. 5B. In the welding stage 500, the pushing operation by the push blade 420 aligns the coil springs 10 in a well-defined position along the y-axis.

As illustrated in FIG. 4B, the push blade 420 pushes the coil springs 10 to the region of the welding tool 510, so that the welding tool 510 can then be used to weld the fabrics 21, 22 together, thereby forming pockets individually enclosing the coil springs 10. As further illustrated in FIG. 4B, the coil springs 10 may expand to some degree in the region of the welding tool 510. This expansion is typically limited by the fabrics 21, 22. To facilitate the pushing operation, the conveyor belts 210 of the conveyor belt mechanisms may be slightly offset in the vertical direction so that the conveyor belt 210 which comes first along the pushing direction is positioned slightly higher than the next conveyor belt 210. In this way, it can be avoided that the coil springs 10 get caught at the transition between the conveyor belts. In a similar way, the conveyor belt 210 which comes last along the pushing direction may be positioned slightly higher than the upper surface of the anvil platform 520. In this way, it can be avoided that the coil springs 10 get caught at the transition from the conveyor belt 210 to the welding stage 500.

Figure 6:
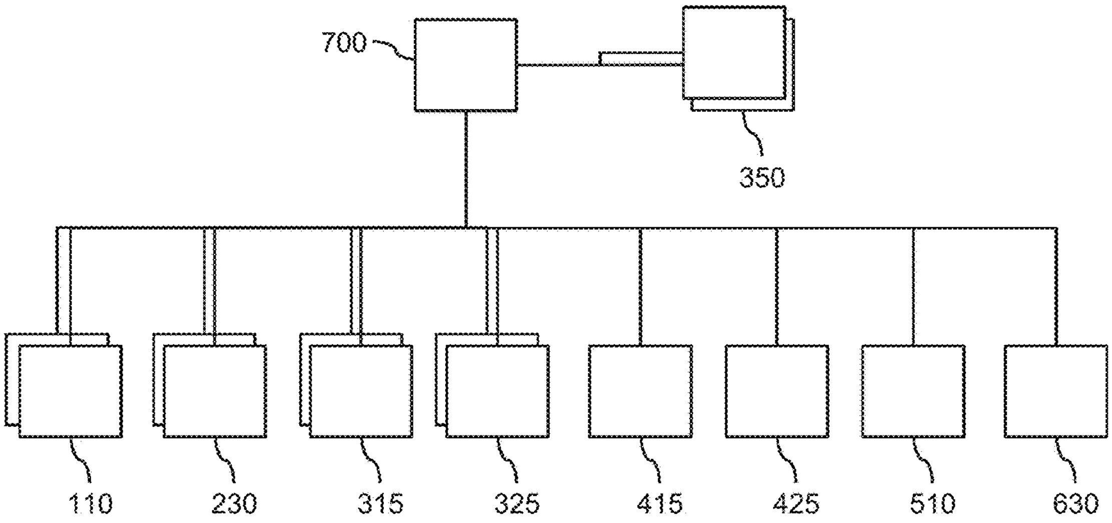
FIG. 6 shows a block diagram for schematically illustrating a control architecture of the pocketed spring assembly machine.

FIG. 6 shows a block diagram for schematically illustrating a control architecture of the pocketed spring assembly machine 100. As illustrated, the pocketed spring assembly machine 100 is provided with a controller 700 which controls components of the pocketed spring assembly machine 100, in particular the coil winding devices 110, the electric motors 230 driving the belt conveyor mechanisms 200, the drive mechanism 315 of the lift platforms 310, the drive mechanisms 325 of the sliders 320, the actuator mechanism 415 of the compression device 410, the actuator mechanism 425, 426 of the push blade 420, the welding tool 510, and various transport mechanisms of the pocketed spring assembly machine 100, such as the transport roller 630. The controller 700 may for example be implemented on the basis of one or more processors executing program code stored in a computer-readable memory. The controller 700 may control the components to operate as explained above and coordinate operation of the components. For this purpose, the controller 700 may provide control signals to the components. The controller 700 may control at least some of the components based on input provided by one or more sensors of the pocketed spring assembly machine 100, such as by the above-mentioned sensor 350. For example, operation of the belt conveyor mechanisms 200 and coil transfer mechanisms 300 may be controlled and/or coordinated based on inputs provided by the sensors 350.

Figure 7:
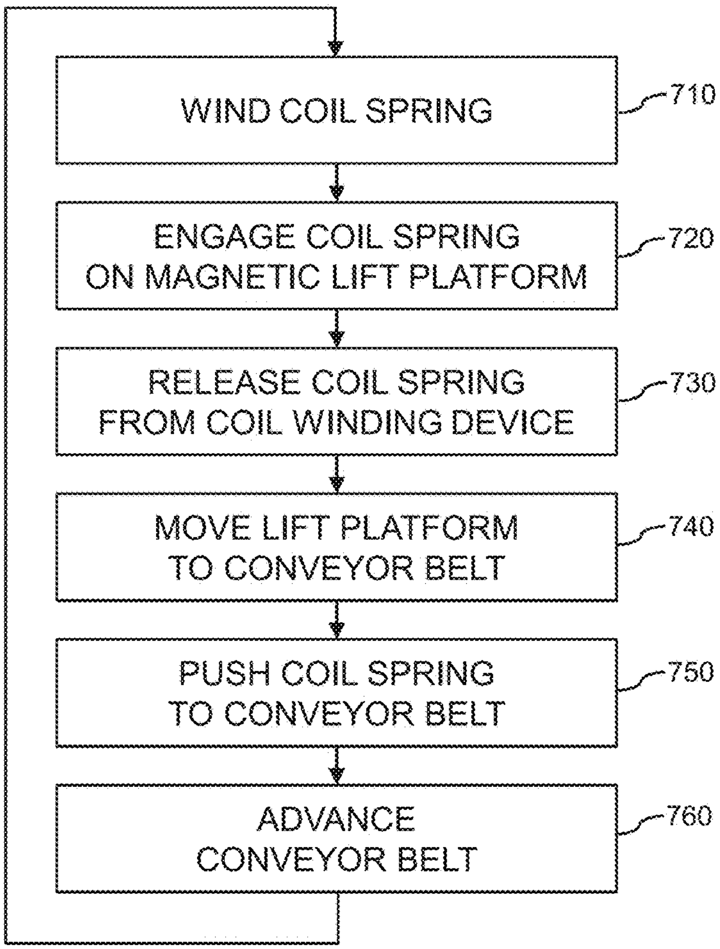
FIG. 7 shows a flowchart for schematically illustrating a method utilized in a pocketed spring assembly machine according to an embodiment of the invention.

FIG. 7 shows a flowchart for schematically illustrating a method performed in the pocketed spring assembly machine 100. The method may be used for transferring coil springs from a coil winding device of the pocketed spring assembly machine 100, e.g., one of the above-mentioned coil winding devices 110, to a conveyor belt of the pocketed spring assembly machine, e.g., one of the above-mentioned conveyor belts 210. The method may be performed under control of the above-mentioned controller 700.

At step 710, the coil winding device winds a coil spring, such as one of the above-mentioned coil springs 10, 10', 10". The coil spring 10 is wound from a magnetic wire, such as from steel wire. As explained above, winding of the coil spring may be accomplished in a vertical orientation of the coil spring, by winding around a vertical axis, so that the coil spring can be output from the coil winding device in a vertical orientation, without requiring rotation of the finished coil spring.

At step 720, the coil spring wound at step 710 is engaged on a magnetic lift platform, such as the above-mentioned lift platform 310. This is accomplished before releasing the coil spring from the coil winding device, e.g., before cutting the coil spring from the wire used for forming the coil spring. As explained above, the engagement may involve that a lower end ring of the coil spring is held by magnetic force on an upper surface of the lift platform.

At step 730, the coil spring is released from the coil winding device, e.g., by cutting the coil spring from the wire used for forming the coil spring. At this point, the magnetic engagement of the coil spring on the lift platform may help to ensure that the coil spring is reliably held in a well-defined position.

At step 740, the lift platform moves from the output of the coil winding device to the conveyor belt. In particular, the lift platform moves to a position in which the upper surface of the lift platform, on which the coil spring is engaged, is aligned with a horizontal conveying plane of the conveyor belt. The movement of the lift platform may be driven by a drive mechanism based on a crank drive, such as the above-mentioned drive mechanism 315 which includes the crank drive 316. In this case, the position in which the upper surface of the lift platform is aligned with the conveying plane of the conveyor belt may correspond to a dead center of the crank drive. In this way, the movement of the lift platform may intrinsically slow down in the range of the position in which the upper surface of the lift platform is aligned with the conveying plane of the conveyor belt, thereby facilitating transfer of the coil spring from the lift platform as explained below in connection with step 750. During the movement of the lift platform, the magnetic engagement of the coil spring on the lift platform helps to ensure that the coil spring is reliably held on the lift platform, even if vertical acceleration of the lift platform exceeds gravity acceleration.

At step 750, a slider, such as the above-mentioned slider 320, pushes the coil spring from the lift platform to the conveyor belt. This is accomplished while the lift platform is in the position in which the upper surface of the lift platform is aligned with the conveying plane of the conveyor belt. For pushing the coil spring from the lift platform to the conveyor belt the slider may move in a horizontal direction, e.g., aligned with a conveying direction of the conveyor belt. However, other directions of pushing the coil spring could be utilized as well, e.g., a horizontal direction which is transverse to the conveying direction of the conveyor belt. As explained above, the conveyor belt may be magnetic as well, thereby helping to ensure that the coil spring is reliably held in position on the conveyor belt. While pushing the coil spring from the lift platform to the conveyor belt, the conveyor belt may be stationary or may move.

At step 760, the conveyor belt is advanced and steps 710 to 760 may be repeated for a further coil spring. The advancement of the conveyor belt between transferring the individual coil springs on the conveyor belt may be used to control the relative spacing of the coil springs on the conveyor belt. Further, the advancement of the conveyor belt may be used to bring the coil springs into a desired end position for further transfer into a welding stage of the pocketed spring assembly machine, such as the above-mentioned welding stage 500.

It is noted that the method of FIG. 7 could be adapted for other orientations of the conveyor belt. The orientation of winding the coil spring and the orientation in which the coil spring is transferred by the lift platform could then be adapted to be perpendicular to the conveying plane of the conveyor belt, thereby avoiding rotation of the coil spring in the transfer from the coil winding device to the conveyor belt.

Figure 8:
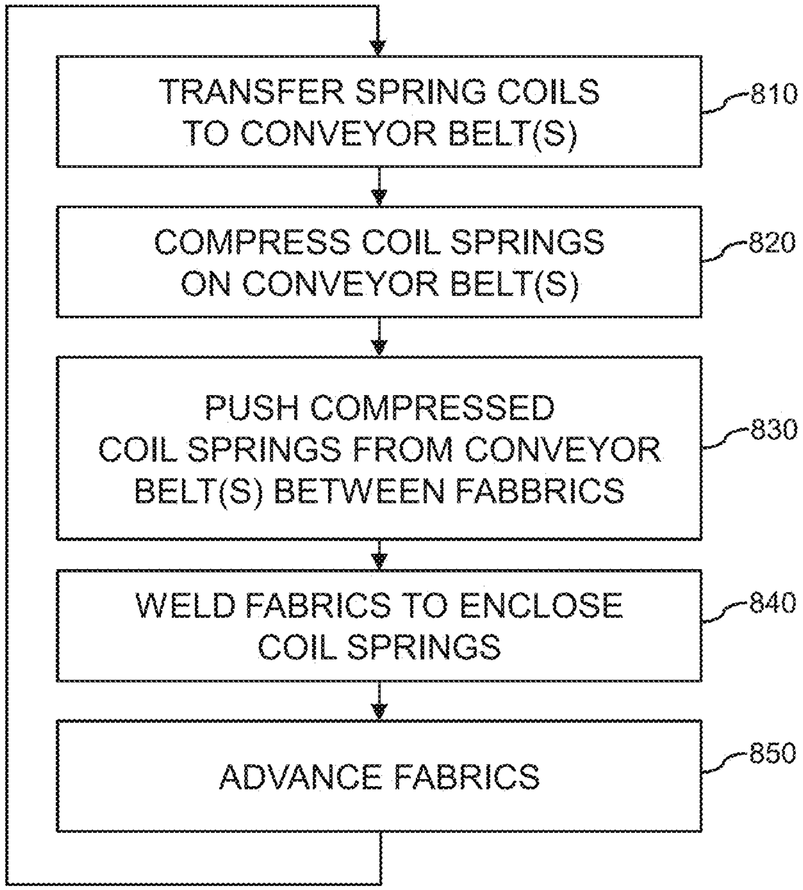
FIG. 8 shows a flowchart for schematically illustrating a method utilized in a pocketed spring assembly machine according to an embodiment of the invention.

FIG. 8 shows a flowchart for schematically illustrating a method performed in the pocketed spring assembly machine 100. The method may be used for inserting coil springs between the 21, 22 fabrics for forming pockets enclosing the coil springs. The method may be performed under control of the above-mentioned controller 700.

At step 810, coil springs are transferred to one or more conveyor belts, such as the above-mentioned conveyor belts 210. This may be accomplished by a method as explained in connection with FIG. 7. The conveyor belt(s) may be substantially horizontal. When using multiple conveyor belts, these multiple conveyor belts may be arranged in parallel to each other. Each of the multiple conveyor belts may receive the coil springs from a different coil winding device. The multiple conveyor belts may be individually controllable. By controlling advancement of the conveyor belt(s) in a conveying direction, the spring coils may be positioned according to a desired arrangement relative to each other and relative to the welding stage. As mentioned above, the conveyor belt(s) may be magnetic, thereby helping to ensure that the coil springs are reliably held in position on the conveyor belt.

At step 820, the coil springs are compressed on the conveyor belt(s). This is accomplished by the compression device 410 which is configured to simultaneously compress all the coil springs on the conveyor belt(s). Here, guide elements of the conveyor belt(s), such as the above-mentioned guide element 240, may help to ensure that the compressed coil springs remain in a well-defined position.

At step 830, the push blade 420 pushes the compressed coil springs from the conveyor belt(s) between the fabrics 21, 22 and into the welding stage 500 of the pocketed spring assembly machine 100. This is accomplished in a direction which is parallel to a conveying plane of the conveyor belt(s) and transverse to the conveying direction of the conveyor belts. When using multiple parallel conveyor belts, the pushing operation by the push blade 420 may at the same time align the coil springs from the different conveyor belts in the transverse direction, thereby forming a single row of coil springs including coil springs from the different conveyor belts and different coil winding devices. By using an individually controllable conveyor belt(s), various distances between coil springs in the row can be set. Further, utilization of multiple coil winding devices each associated with a corresponding individual conveyor belt, as explained above for the coil winding devices 110, may allow for efficiently providing coil springs differing in spring geometry and/or wire thickness in the same row.

At step 840, the fabrics 21, 22 are welded together in the welding stage 500 to form the pockets individually enclosing the coil springs of the row formed at step 840. Here, the same welding horn may be used to sequentially form multiple welds at different positions along the row and/or multiple welding horns may be used to simultaneously form multiple welds at different positions along the row.

At step 850, the fabrics 21, 22 are advanced to remove the coil springs enclosed in the pockets formed at step 840 from the welding stage 500. The processes of steps 810, 820, 830, 840, and 850 may then be repeated for another row of coil springs.

Figure 9A:
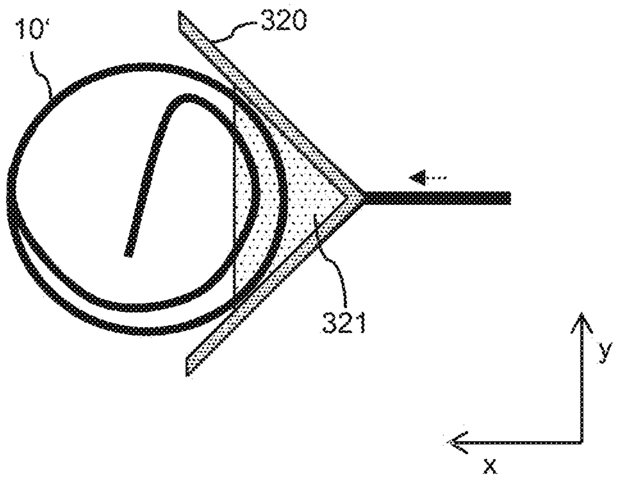
FIGS. 9A, 9B and 9C further illustrate structures of a slider of the coil transfer mechanism.
Figure 9B:
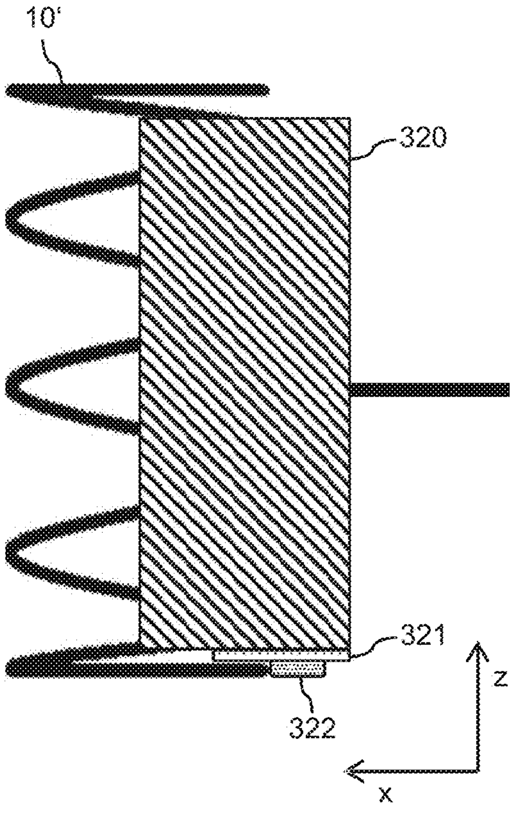
Figure 9C:
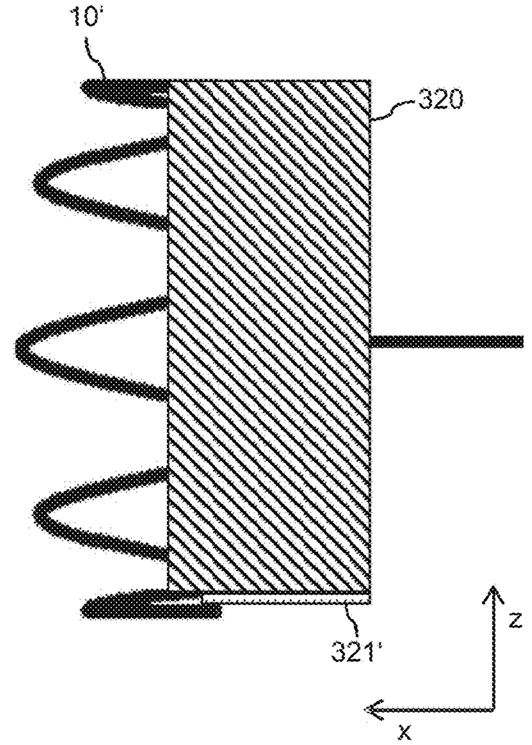

FIGS. 9A-9C further illustrate details of the slider 320. FIG. 9A shows a partial top view which illustrates the above-mentioned V-shaped cross-sectional shape of the slider 320. As can be seen, the V-shaped cross-sectional shape may help to align the coil spring 10' being pushed along the y-direction. Further, the V-shape ensures that the coil spring 10' being pushed may be supported on multiple different positions in the x-y plane, so that undesired tilting of the coil spring 10' can be avoided. FIG. 9B shows a partial side view which illustrates that the slider 320 may extend substantially over the vertical length of the coil spring 10' being pushed, so that the coil spring 10' being pushed may be supported on multiple different positions along the vertical direction (z-direction) and undesired tilting of the coil spring 10' can be avoided.

As further illustrated, the slider 320 may be provided with a horizontal support element 321 which engages between two windings of the coil spring 10' being pushed. In the illustrated example, the horizontal support element 321 is configured to engage on the lower end ring of the coil spring 10'. The horizontal support element 321 provides a support for the lower end ring in the vertical direction and thereby further helps to support the coil spring 10' in a reliable manner. This may be specifically beneficial in the case of barrel shaped coil springs 10', as illustrated in FIG. 9C. For accommodating different end-ring sizes of the coil springs, the horizontal support element 321 may be interchangeable or adjustable. By way of example, FIG. 9C illustrates a replacement horizontal support element 321' which, as compared to the horizontal support element 321 shown in FIGS. 9A and 9C, has a larger extension in the x-direction to accommodate the smaller end ring size of a barrel-shaped coil spring 10'. As illustrated, the horizontal support element 321, 321' may be substantially plate-shaped. In some scenarios, the horizontal support element 321, 321' may be provided with a vertical protrusion 322. The vertical protrusion 322 may help to avoid incorrect engagement of the horizontal support element 321, 321'. In the example of FIGS. 9A, 9B, 9C, an downward vertical protrusion 322 on the horizontal support element 321, 321' may ensure a well-defined engagement of the slider 320 with the lower end ring of the coil spring 10'.

Figure 10:
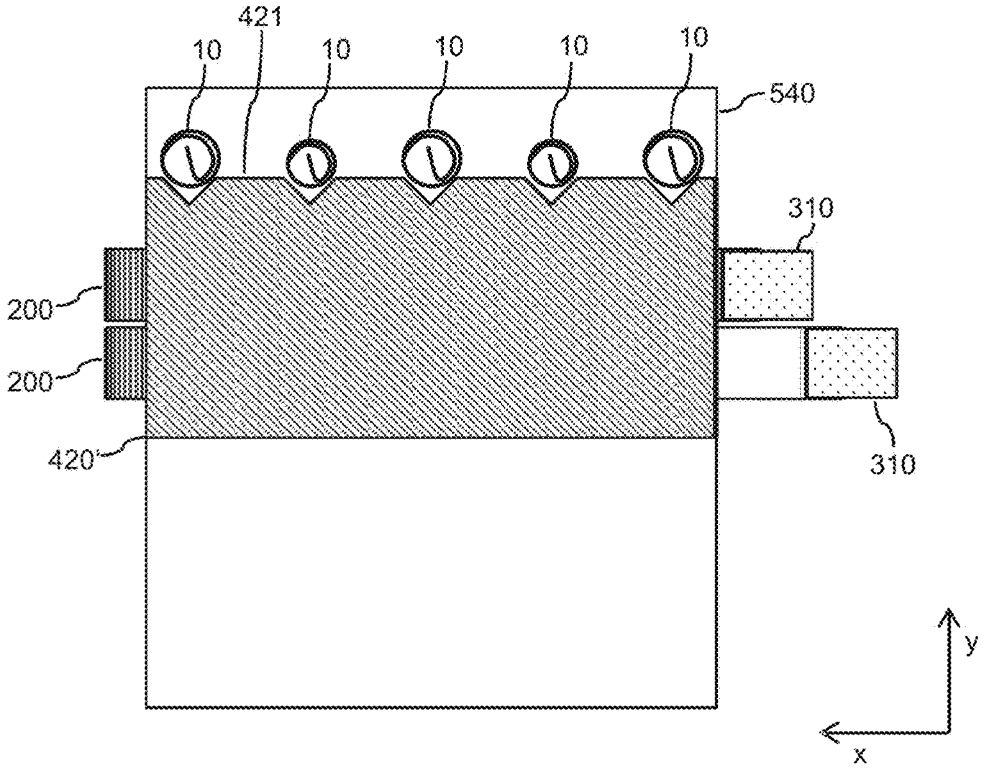
FIG. 10 illustrates further structures of the coil insertion mechanism according to an embodiment of the invention.

In FIGS. 5A and 5B the push blade 420 is illustrated as being provided with a straight-lined front edge which engages the coil springs 10. Such a configuration of the push blade 420 may be utilized in a flexible manner with respect to various arrangements and geometries of the coil springs 10. In some scenarios, the shape of the front edge of the push blade 420 may however be adapted to align the coil springs 10 being pushed into a desired position along the x-direction and/or along the y-direction. FIG. 10 shows an example of an alternative push blade 420'. As illustrated in FIG. 10, the front edge 421 of the push blade 420', which engages the coil springs 10, is provided with V-shaped cutouts. The V-shaped cutouts define positions along the x-direction on which the coil springs 10 are aligned during the pushing operation of the push blade 420. This may help to enhance the precision of positioning of the coil springs in the welding stage 500. In some scenarios, the depths of the V-shaped cutouts could vary to individually set a desired end position of the coil spring 10 along the y-axis. The V-shape of the cutouts in the example of FIG. 10 may be used to achieve reliable alignment with respect to various spring geometries, e.g., various spring diameters. However, other shapes of the cutouts could be used as well, e.g., circular or elliptic shapes.

It is noted that the above examples are susceptible to various modifications. For example, the above-described coil transfer mechanism 300 could also be utilized in a pocketed spring assembly machine with only one horizontal conveyor belt. Further, the arrangement of the coil transfer mechanism 300 with respect to the conveyor belt 210 could vary. For example, rather than transferring the coil springs 10 on the short edge of the conveyor belt, by pushing in the conveying direction of the conveyor belt 210, the coil springs 10 could also be transferred on the long edge of the conveyor belt 210, by pushing in a direction transverse to the conveyor belt 210. Still further, the illustrated coil transfer mechanism 300 may also be combined with various other mechanisms for transferring the coil springs 10 from the conveyor belt 210 to the welding stage 500 and with various types of additional or alternative processing in the welding stage 500. Still further, it is noted that the illustrated concepts are not limited to a horizontal or substantially horizontal orientation of the conveyor belt(s). For example, it is also conceivable to arrange the conveyor belt(s) with a vertical conveying plane and correspondingly adapt the arrangement of the other components, such as the orientation and movement direction of the lift platform 310. In such cases, the magnetic force provided by the conveyor belts may ensure that the coil springs are reliably held in position. Further, in the case of a non-horizontal orientation of the lift platform 310, the magnetic force which may be provided by the lift platform 310 may ensure that the coil springs are reliably held in position on the lift platform 310.

What is claimed is:

1. A method for transferring coil springs from a coil winding device to a conveyor belt of a pocketed coil assembly machine, the method comprising the steps:

before release of a coil spring in a substantially vertical orientation at an output of the coil winding device, engaging a lower end ring of the coil spring on a substantially horizontal upper surface of a magnetic lift platform;

moving the lift platform between the output of the coil winding device and the conveyor belt; and pushing the coil spring by a slider from the lift platform to the conveyor belt, the coil spring being received by said conveyor belt in a substantially vertical orientation.

2. The method according to claim 1, further comprising the steps:

moving the lift platform to a position aligned with a conveying plane of the conveyor belt; and pushing the coil spring from the lift platform to the conveyor belt when the lift platform is in said position aligned with the conveying plane.

3. The method according to claim 1, further comprising the step:

driving said moving of the lift platform by a crank drive.

4. The method according to claim 1, further comprising the step:

driving said moving of the lift platform by a crank drive, and wherein said position aligned with the conveying plane corresponds to a dead center of the crank drive.

5. The method according to claim 1, further comprising the step:

driving said moving of the lift platform with vertical acceleration higher than gravity acceleration.

6. The method according to claim 1, wherein said pushing is in a direction aligned with a conveying direction of the conveyor belt.

7. A method for transferring coil springs from a coil winding device to a conveyor belt of a pocketed coil assembly machine, the method comprising the steps:

before release of a coil spring at an output of the coil winding device, engaging a lower end ring of the coil spring on a substantially horizontal upper surface of a magnetic lift platform;

moving the lift platform between the output of the coil winding device and the conveyor belt; and pushing the coil spring by a slider from the lift platform to the conveyor belt, the coil spring being received by said conveyor belt in a substantially vertical orientation.

8. The method according to claim 7, further comprising the steps:

moving the lift platform to a position aligned with a conveying plane of the conveyor belt; and pushing the coil spring from the lift platform to the conveyor belt when the lift platform is in said position aligned with the conveying plane.

9. The method according to claim 7, further comprising the step:

driving said moving of the lift platform by a crank drive.

10. The method according to claim 7, further comprising the step:

driving said moving of the lift platform by a crank drive, and wherein said position aligned with the conveying plane corresponds to a dead center of the crank drive.

11. The method according to claim 7, further comprising the step:

driving said moving of the lift platform with vertical acceleration higher than gravity acceleration.

12. The method according to claim 7, wherein said pushing is in a direction aligned with a conveying direction of the conveyor belt.

* * * * *